(12) United States Patent
Aderek et al.

(10) Patent No.: US 6,246,201 B1
(45) Date of Patent: Jun. 12, 2001

(54) ELECTRONIC CAM CONTROL SYSTEM

(75) Inventors: Andrzej Aderek, Charlottesville; Michael Joseph Tuso, Afton; Anirban De, Charlottesville, all of VA (US)

(73) Assignee: GE Fanuc Automation North America Inc., Charlottesville, VA (US)

(*) Notice: Subject to any disclaimer, the term of this patent is extended or adjusted under 35 U.S.C. 154(b) by 0 days.

(21) Appl. No.: 09/511,760

(22) Filed: Feb. 24, 2000

Related U.S. Application Data

(60) Provisional application No. 60/173,809, filed on Dec. 30, 1999.

(51) Int. Cl.⁷ .................................................. G05B 11/01
(52) U.S. Cl. ...................... 318/632; 318/560; 318/568.1; 318/578; 318/605; 318/652; 318/799
(58) Field of Search ...................................... 318/560, 567, 318/578, 568.11, 568.1, 605, 799, 652, 632

(56) References Cited

U.S. PATENT DOCUMENTS

| | | | |
|---|---|---|---|
| 3,916,571 | * 11/1975 | Seidel | 51/101 R |
| 4,810,941 | * 3/1989 | Ohishi et al. | 318/314 |
| 5,598,304 | * 1/1997 | Choi et al. | 360/78.04 |
| 5,600,221 | * 2/1997 | Tomatsuri et al. | 318/632 |
| 5,631,531 | * 5/1997 | Takizawa et al. | 318/560 |
| 5,923,132 | * 7/1999 | Boyer | 318/34 |
| 6,133,705 | * 10/2000 | Inoue et al. | 318/632 |

* cited by examiner

*Primary Examiner*—Robert E. Nappi
*Assistant Examiner*—Rita Leykin
(74) *Attorney, Agent, or Firm*—Carl Horton, Esq.; Armstrong Teasdale LLP

(57) ABSTRACT

An electronic cam servo apparatus uses a digital servo controller to perform motion equivalent to a mechanical cam. The control apparatus has one data table representing a characteristic of a mechanical cam and utilizes a data interpolation and the first derivative of a cam position profile to determine position and velocity commands to drive a servo motor which performs motion equivalent to a mechanical cam. Alternatively, the control apparatus uses the first cam specific data table to determine the position, velocity and torque/current command to drive a servo motor. The apparatus may additionally use a second data table representing varying cam load to obtain a more accurate torque/current command correction.

28 Claims, 6 Drawing Sheets

ELECTRONIC CAM CONTROL SYSTEM

CROSS REFERENCE TO RELATED APPLICATIONS

This application claims the benefit of U.S. Provisional Application No. 60/173,809, filed Dec. 30, 1999, which is hereby incorporated by reference in its entirety.

BACKGROUND OF THE INVENTION

This invention relates generally to positioning mechanisms, and more specifically to electronically controlled cam servo control systems.

At least one known electronic servo system includes a plurality of installed modules, typically referred to as input/output (I/O) modules. In one application, an I/O module functions as a digital servo control module to perform precise, complex motion coordinated between two axes similar to a mechanical cam.

A control system with a velocity and torque/current feed forward compensation is used to control speed and dynamic accuracy of motion. However, these systems are complex and require large amounts of data storage.

Accordingly, it would be desirable to provide a less complex electronic cam servo control system which delivers performance comparable to existing systems, is simpler for a user to operate, and requires less data storage space.

BRIEF SUMMARY OF THE INVENTION

In an exemplary embodiment, an electronic cam servo control system includes a processor, a digital servo control module capable of performing motion equivalent to a mechanical cam, an encoder, and a control program. A method for delivering high accuracy cam servo motion and simplifying cam motion applications in an electronic system includes importing a cam position profile and acquiring cam shaft position and velocity from an encoder interface. A cam servo position command is calculated using a cam position profile table. In addition, first derivatives of the cam position profile are calculated. Cam shaft position and cam shaft velocity are acquired which allows a cam servo velocity compensation command to be calculated by multiplying the first derivative of the cam position profile by the cam shaft velocity. A cam position command and a cam velocity compensation command are then sent to the control module for execution.

DETAILED DESCRIPTION OF THE INVENTION

Figure 1:
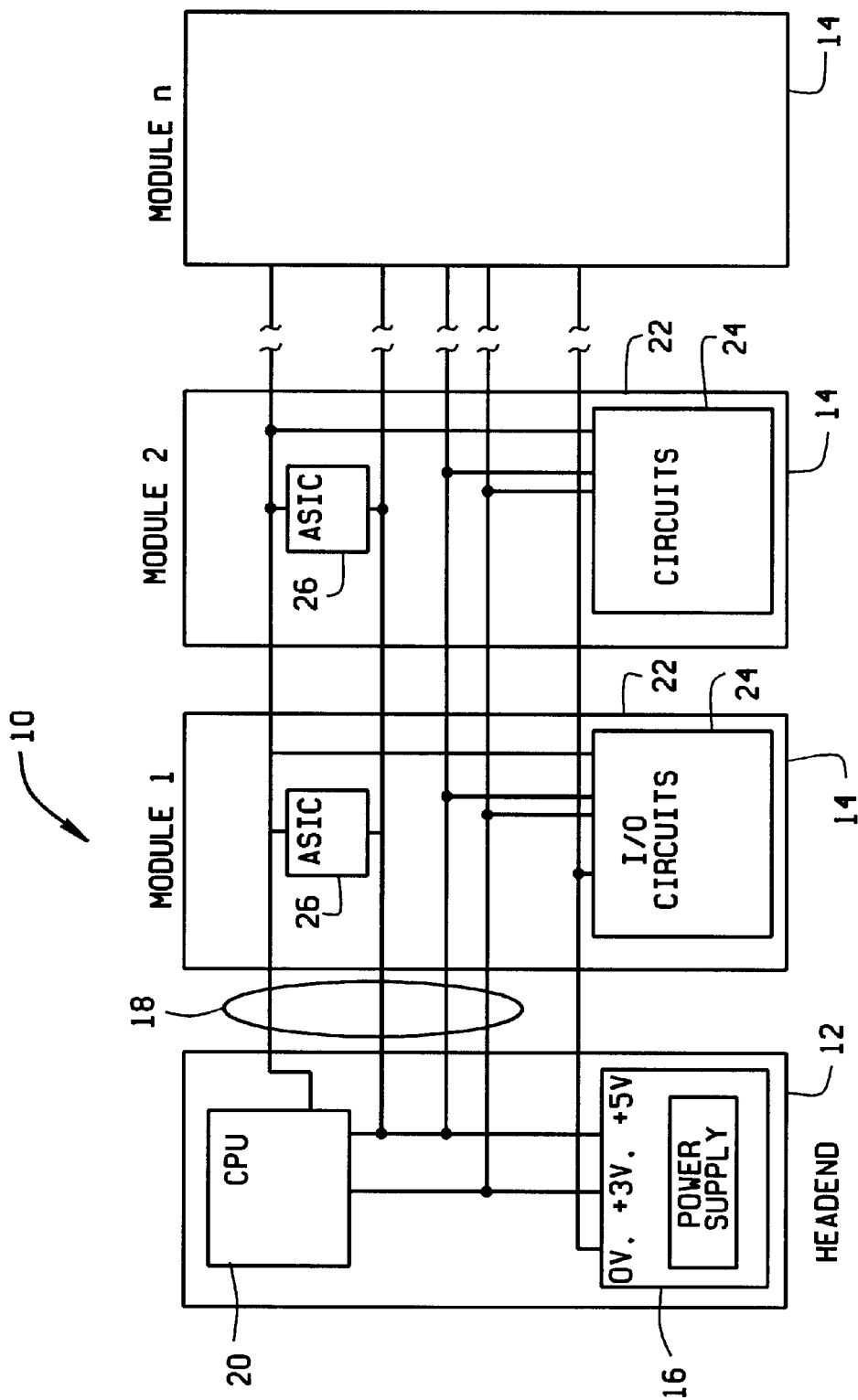
FIG. 1 is a schematic illustration of a known electronic system including a plurality of I/O modules.

FIG. 1 is a schematic illustration of an existing programmable electronic cam servo control system 10. System 10 includes a headend unit 12 and a plurality of modules 14, which for illustrative purposes are numbered Module 1 through Module n and called input/output (I/O) modules. Headend unit 12 includes a primary power supply 16, a signal interconnection backplane 18, and a central processing unit (CPU) 20. I/O modules 14 include module bases 22, which further include input/output circuits 24 and an application specific integrated circuit (ASIC) 26. One such application of I/O module 14 is as a cam shaft encoder and digital servo controller. In a cam shaft encoder application, input/output circuits 24 include an encoder interface. Although the invention is described in terms of system 10, it is to be understood that the invention can be practiced using other electronic cam servo control systems.

In the present invention, cam servo motion is delivered and cam motion applications are simplified using an electronic cam servo control system. The electronic cam servo control system performs servo motor motion equivalent to a mechanical cam. The electronic cam servo control system utilizes a data table (not shown) which includes sets of data describing cam positioning characteristics. The data table contains pairs of cam shaft positions (master positions) and motor positions (slave positions) defining a cam profile. In most cases cam shaft positions and motor positions are the only data the user has to prepare a cam motion program. The electronic cam servo control system utilizes spline interpolation with continuous first derivative to generate interpolation coefficients. Coefficients are preprocessed and stored in a motion controller memory to reduce the amount of real time computations.

Figure 2:
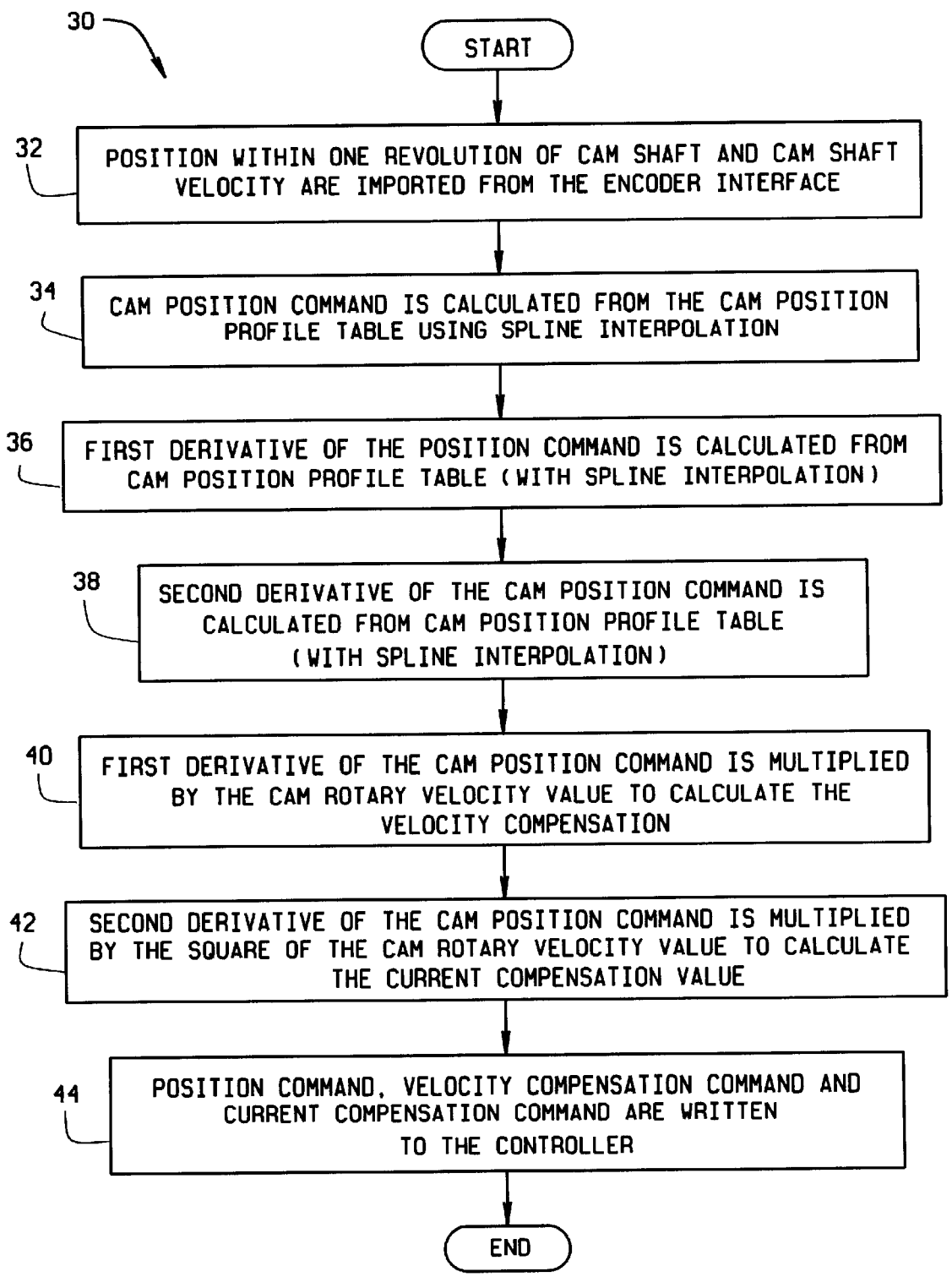
FIG. 2 is a flowchart detailing an exemplary electronic cam servo control system.

FIG. 2 is a flowchart 30 showing the sequence of operations used in an electronic cam implementation according to the present invention. A cam shaft position within one cam shaft revolution and cam shaft velocity are imported 32 from the encoder interface. A cam position command is calculated 34 from a cam position profile table using spline interpolation. A first derivative of the interpolated cam position profile is calculated 36 using the cam position profile table with spline interpolation. A second derivative of the interpolated cam position profile is calculated 38 from the first derivative of the interpolated cam position profile. A velocity compensation command is calculated 40 by multiplying the first derivative of the interpolated cam position profile by the cam shaft velocity. A current compensation command is calculated 42 by multiplying the second derivative of the interpolated cam position profile by the square of the cam shaft velocity. The position command, the velocity compensation command and the current compensation command are written 44 to controllers to control position, velocity, and current respectively.

Figure 3:
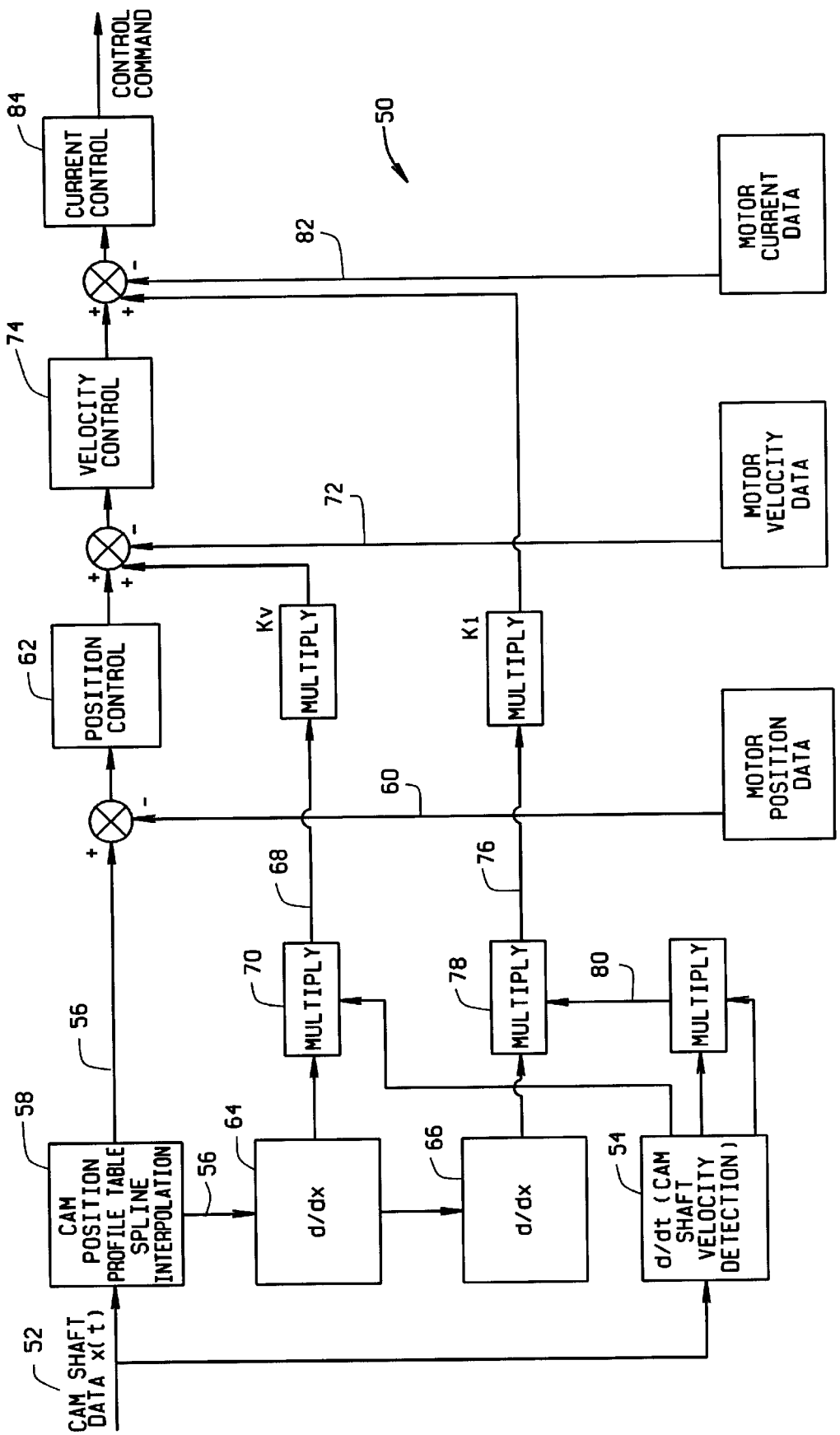
FIG. 3 is a control system diagram that embodies the flowchart of FIG. 2.

A block diagram of a control system 50 according to flowchart 30 is shown in FIG. 3. Cam shaft position 52 within one cam shaft revolution and cam shaft velocity 54 from the encoder interface are applied to control apparatus 50. A cam position command 56 is calculated from a cam position profile table 58 using spline interpolation. An internal representation of the cam profile data (defined by the user) are in cam position profile table 58 in addition to preprocessed interpolation coefficients. A difference between the cam position command 56 and current motor position data 60 is calculated and sent to position control block 62 to control cam position.

A first derivative 64 of the cam position profile is calculated using cam position profile table 58 with spline interpolation. A second derivative 66 of interpolated cam position profile is calculated from the first derivative 64 of the cam position profile. A velocity compensation command 68 is calculated by multiplying 70 the first derivative 64 of the cam position profile table 58 by cam shaft velocity 54. A net commanded velocity is the sum of an output of the position control block 62 and the velocity compensation command 68 minus current motor velocity data 72 and is sent to a velocity control block 74 to control cam velocity.

A current compensation command 76 is calculated by multiplying 78 the second derivative 66 of the cam position profile table 58 by the square 80 of the cam shaft velocity 54. A net commanded current is the sum of an output of the velocity control block 74 and the current compensation command 76 minus current motor current data 82 and is sent to a current control block 84 to control cam servo current.

Figure 4:
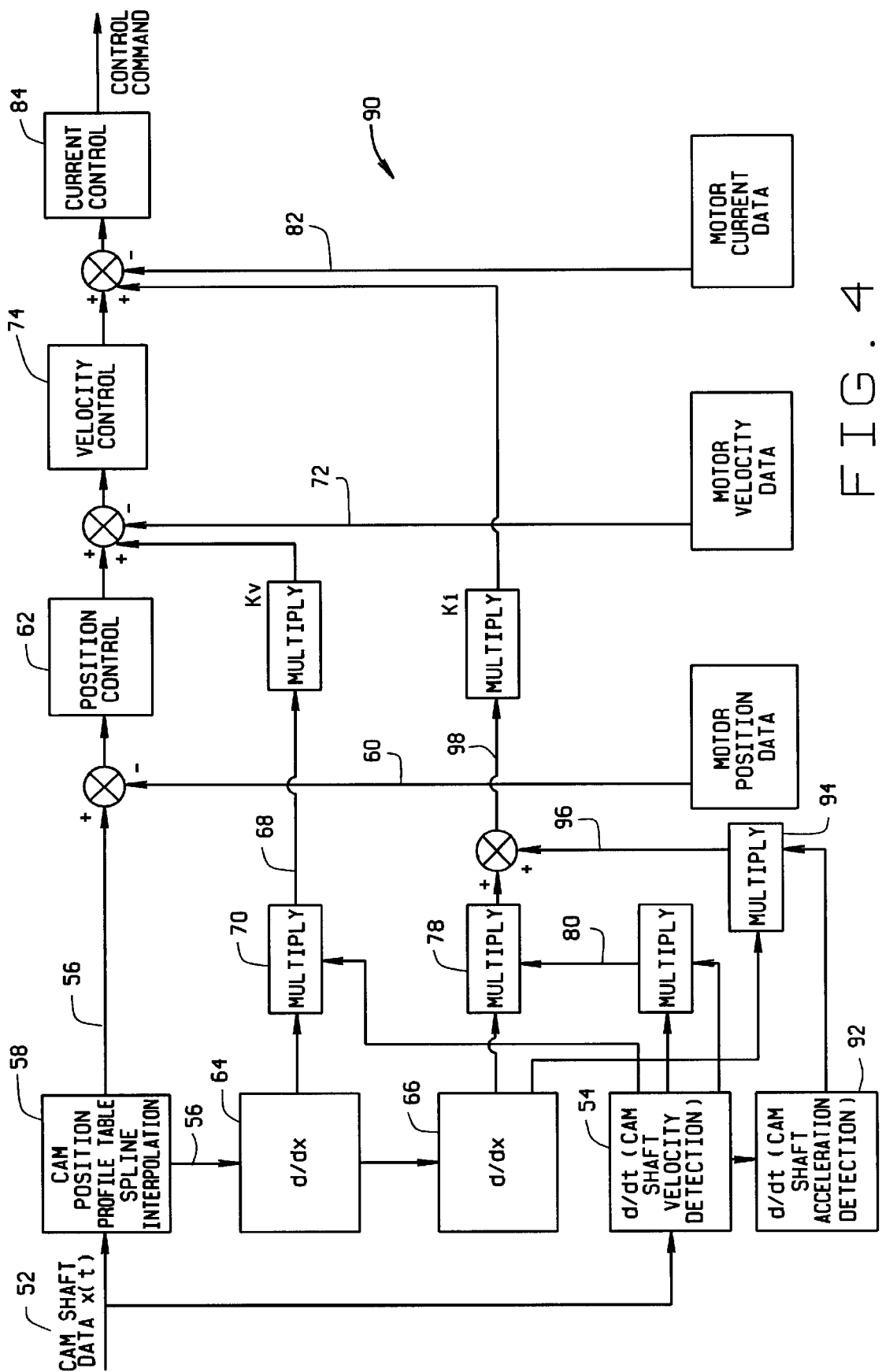
FIG. 4 is a control system diagram that has additional acceleration correction.

FIG. 4 shows a functional block diagram 90 for the cam servo control system 50 in FIG. 3 having additional correction from a cam shaft acceleration 92. Cam shaft acceleration 92 is generated by taking a derivative of the cam shaft velocity 54. Cam shaft acceleration 92 is multiplied 94 by the second derivative 66 of the cam position profile table 56 providing an additional acceleration factor 96. Additional acceleration factor 96 is added to the current compensation command 76 resulting in an adjusted current compensation command 98. Net commanded current is the sum of an output of the velocity control block 74 and the adjusted current compensation command 98 minus current motor current data 82 and is sent to current control block 84 to control cam current. Such system is suitable for applications where cam shaft velocity 54 is varying and adjusted current compensation command 98 has substantial impact on the motion accuracy.

Figure 5:
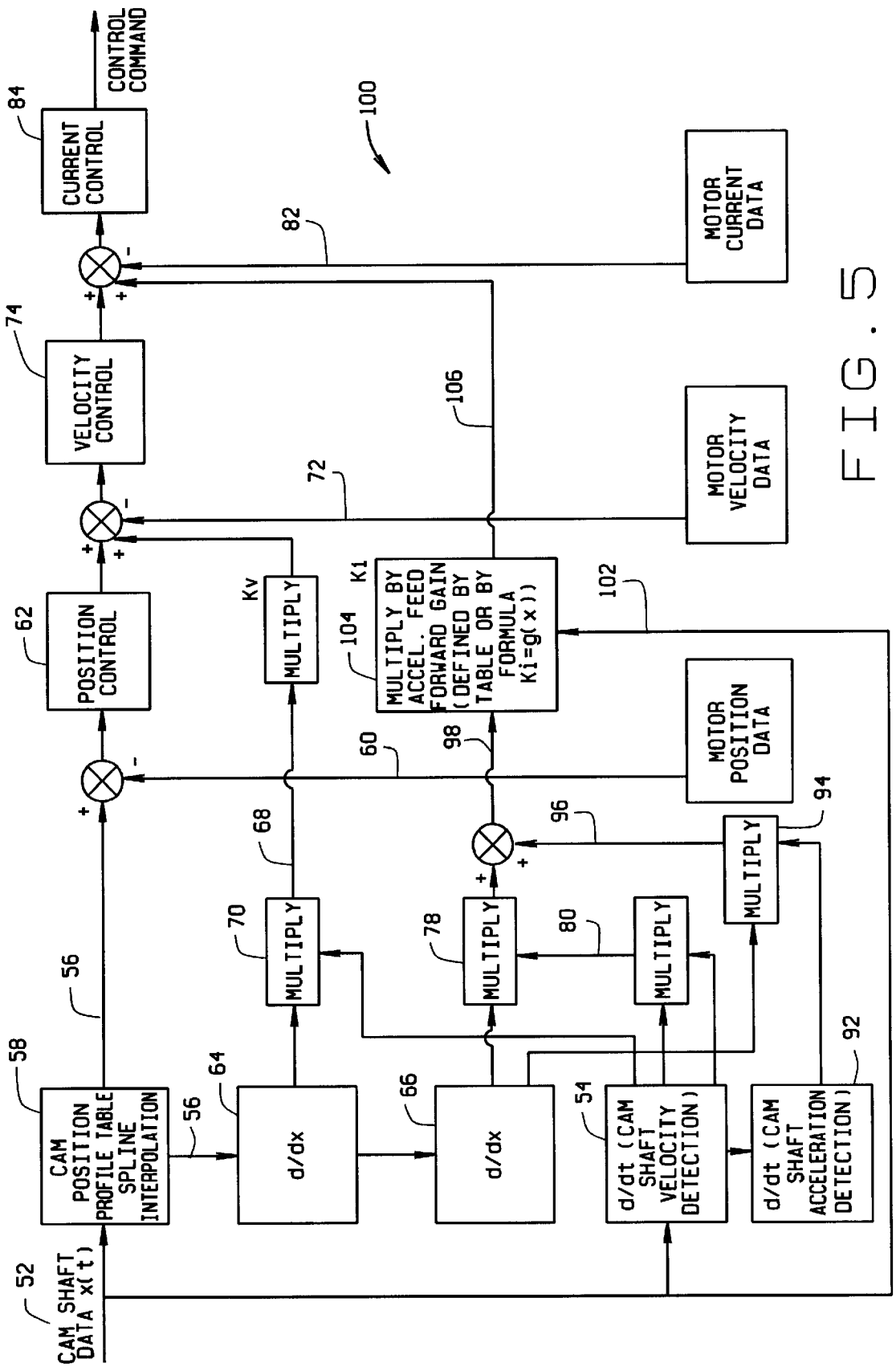
FIG. 5 is a control system diagram that has additional current correction based on a table or formula.

FIG. 5 shows a functional diagram 100 for the cam servo system 50 of FIGS. 3 and 4 with an additional current compensation factor. The combination of cam shaft position 102 and adjusted current compensation command 98 together with table 104 produces a correction factor 106. In one embodiment, corrections due to varying load of the cam are defined by table 104. In an alternative embodiment, table 104 is replaced by a formula g(x). Net commanded current is the sum of an output of the velocity control block 74 and correction factor 106 minus current motor current data 82 and is sent to current control block 84 to control cam servo current.

Figure 6:
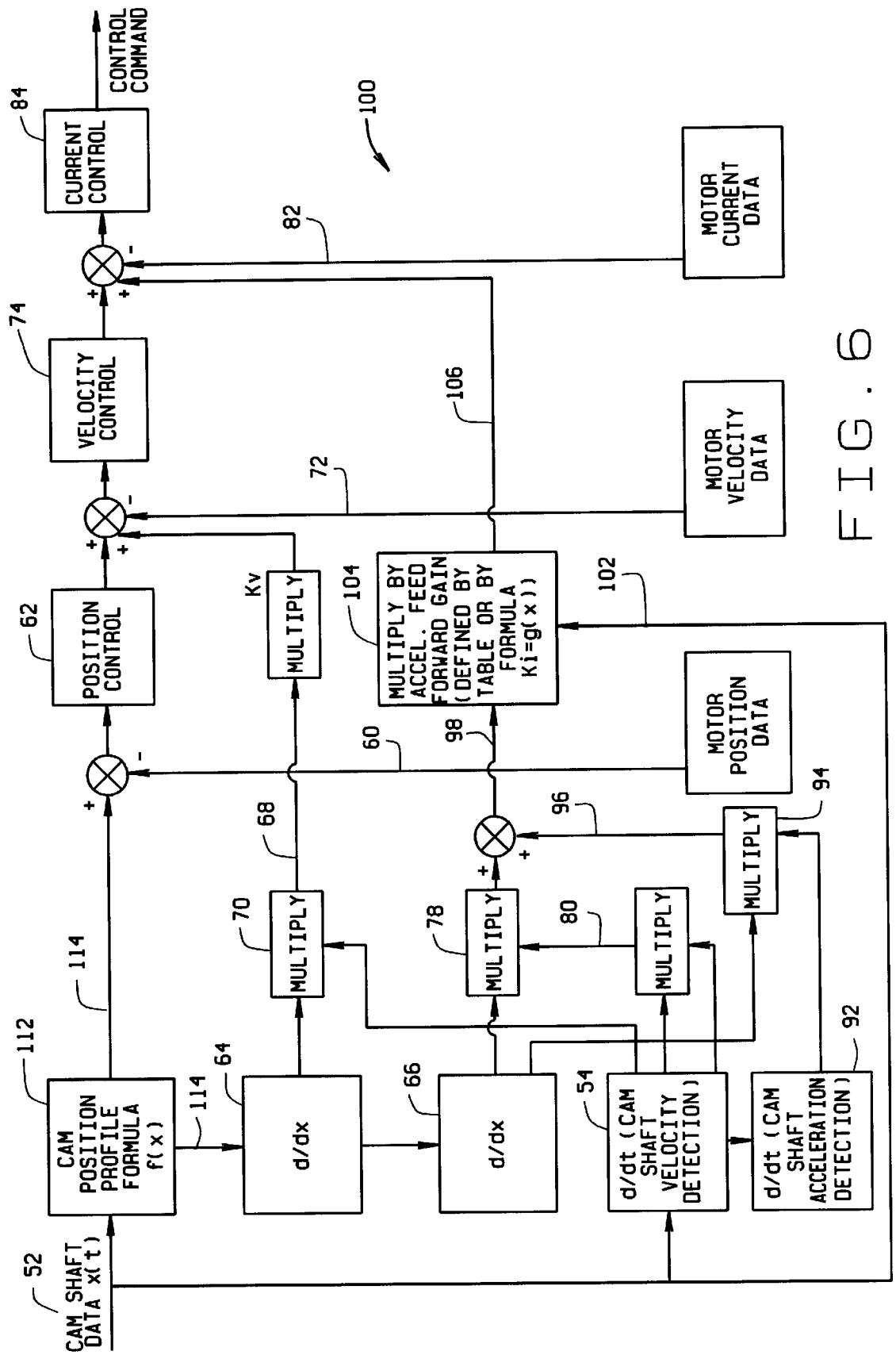
FIG. 6 is a control system diagram where cam position table has been replaced by a formula.

FIG. 6 shows an alternative system diagram 110 for the cam servo system 50 shown in FIGS. 3, 4, and 5. In system 110, cam position profile table 58 (shown in FIGS. 3, 4, and 5) and current correction table (not shown) has been replaced by a cam position profile formula 112. Cam position profile formula 112 provides a cam position formula command 114 to be used in calculating compensation factors and derivatives for the systems in FIGS. 3, 4, and 5 in place of the cam position profile table 56.

The cam control system described herein delivers high performance and accurate results using a velocity and torque/current feed forward compensation technique optimized for cam characteristics. The system uses different methods than known systems and therefore is significantly simpler for a user to program and requires smaller amounts of data to be stored than existing systems.

While the invention has been described in terms of various specific embodiments, those skilled in the art will recognize that the invention can be practiced with modification within the spirit and scope of the claims.

What is claimed is:

1. A method for controlling cam servo motion in an electronic cam servo control system, the electronic cam servo control system including a processor, a memory loaded with a cam position profile table, a digital servo controller to perform motion equivalent to a mechanical cam, an encoder, and a control program, said method comprising the steps of:
   importing cam shaft position and cam shaft velocity from an encoder interface;
   calculating a cam position command;
   calculating a first derivative of the cam position profile;
   calculating a cam servo velocity compensation command by multiplying the first derivative of the cam position profile by the cam shaft velocity; and
   sending a cam position command and a cam shaft velocity compensation command to the digital servo controller.

2. A method according to claim 1 wherein said step of calculating a cam position command further comprises the step of selecting a cam position command from the cam position profile table.

3. A method according to claim 1 wherein said method further comprises the step of calculating a second derivative of the cam position profile.

4. A method according to claim 3 wherein said method further comprises the step of calculating a current compensation command by multiplying the second derivative of the cam position profile by the square of the cam shaft velocity.

5. A method according to claim 4 wherein said method further comprises the step of sending a current compensation command to a controller.

6. A method according to claim 1 wherein said step of calculating a cam position command from a cam position profile table further comprises the step of using a spline interpolation.

7. A method according to claim 1 wherein said method further comprises the step of calculating a first derivative of the cam shaft position for velocity detection.

8. A method according to claim 7 wherein said method further comprises the step of calculating a second derivative of the cam shaft position for acceleration detection.

9. A method according to claim 8 wherein said method further comprises the step of multiplying the second derivative of the cam shaft position by the second derivative of the cam position profile to determine a cam servo current compensation value.

10. A method according to claim 1 wherein said method further comprises the step of calculating a first derivative of the cam shaft velocity for current compensation.

11. A method according to claim 10 wherein said method further comprises the step of multiplying the first derivative of the cam shaft velocity by the second derivative of the cam position profile to determine a cam servo current compensation value.

12. A method according to claim 4 wherein said step of calculating a current compensation command further comprises the step of adding additional current compensation from a current compensation table.

13. A method according to claim 1 wherein said step of calculating a cam position command further comprises the step of selecting a formula to generate the cam position command.

14. A method according to claim 4 wherein said step of calculating a current compensation command further comprises the step of adding additional current compensation from a formula.

15. An electronic cam servo control system comprising:
   an encoder;
   a processor configured to:
      import a cam shaft position and cam shaft velocity acquired from said encoder;

calculate a cam position command;

calculate a first derivative of the cam position profile;

calculate a cam servo velocity compensation command by multiplying the first derivative of the cam position profile by the cam shaft velocity; and send a cam position command and a cam velocity compensation command to a digital servo controller;

a memory to store cam position profile, cam shaft position and cam shaft velocity acquired by said processor and calculation results of said processor; and a digital servo control module to receive and perform cam position and velocity commands generated by said processor.

16. A system according to claim 15 wherein said processor is further configured to calculate a cam position command from a cam position profile table located in said memory.

17. A system according to claim 15 wherein said processor is further configured to calculate a second derivative of the cam position profile.

18. A system according to claim 17 wherein said processor is further configured to calculate a current compensation command by multiplying the second derivative of the cam position profile by the square of the cam shaft velocity.

19. A system according to claim 18 wherein said processor is further configured to send a current compensation command to said digital servo control module.

20. A system according to claim 15 wherein said processor is further configured to calculate a cam position command from a cam position profile table using a spline interpolation.

21. A system according to claim 15 wherein said processor is further configured to calculate a first derivative of the cam shaft position for velocity detection.

22. A system according to claim 21 wherein said processor is further configured to calculate a second derivative of the cam shaft position for acceleration detection.

23. A system according to claim 22 wherein said processor is further configured to multiply the second derivative of the cam shaft position by the second derivative of the cam position profile to determine a cam servo current compensation.

24. A system according to claim 15 wherein said processor is further configured to calculate a first derivative of the cam shaft velocity for acceleration detection.

25. A system according to claim 24 wherein said processor is further configured to multiply the first derivative of the cam shaft velocity by the second derivative of the cam position profile to determine a cam servo current compensation.

26. A system according to claim 15 wherein said processor is further configured to calculate a current compensation command by adding additional current compensation from a current compensation table.

27. A system according to claim 15 wherein said processor is further configured to calculate a cam position command by selecting a formula to generate the cam position command.

28. A system according to claim 15 wherein said processor is further configured to calculate a current compensation command by adding additional current compensation from a current compensation formula.

* * * * *